Dec. 27, 1960      H. JENSEN      2,966,374
PACKING FOR FACE TYPE SEALS
Filed May 15, 1957
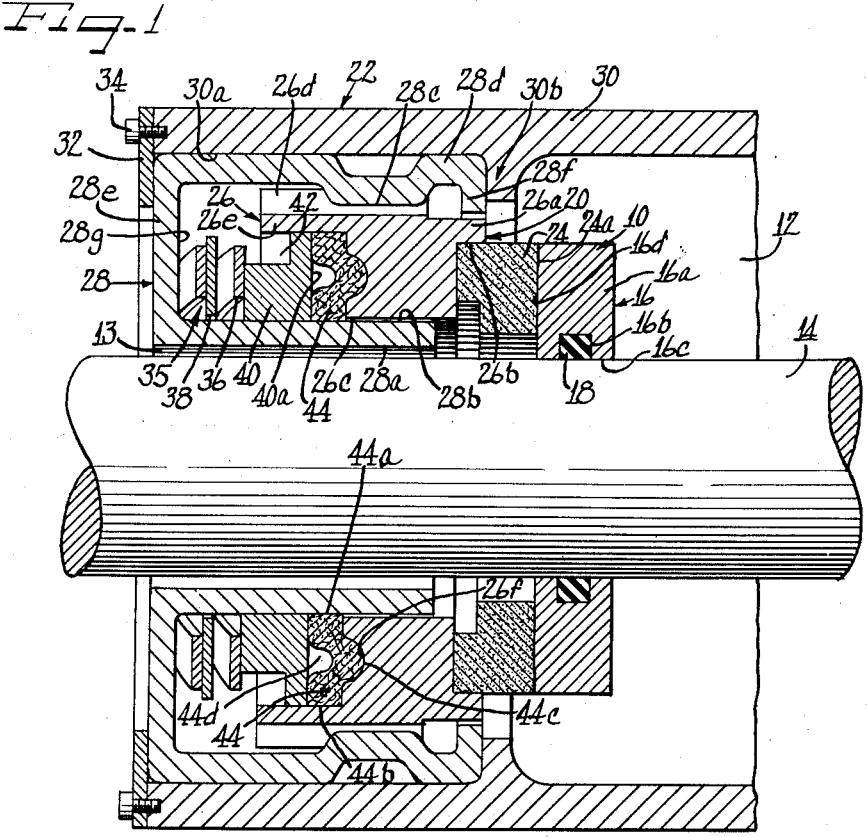
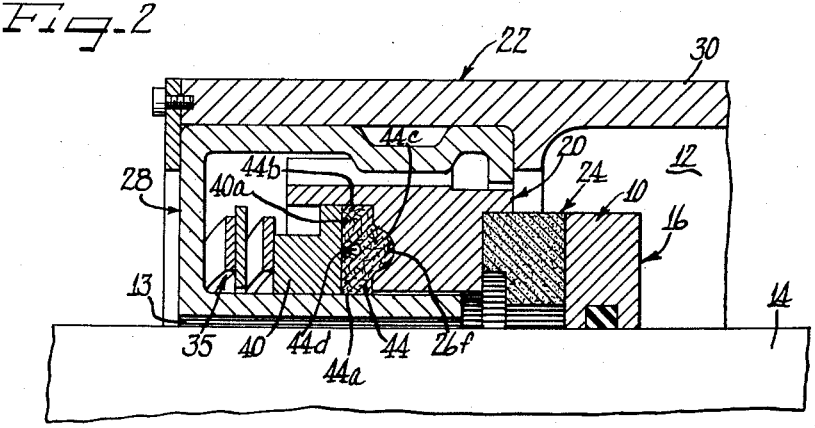
Inventor
Hans Jensen

United States Patent Office 2,966,374
Patented Dec. 27, 1960

2,966,374

PACKING FOR FACE TYPE SEALS

Hans Jensen, Wheeling, Ill., assignor to Gits Bros. Mfg. Co., Chicago, Ill., a corporation of Illinois Filed May 15, 1957, Ser. No. 659,287

4 Claims. (Cl. 286—11.14)

This invention relates to shaft seals of the axially shifting and relatively rotating face-to-face type wherein one part forms a seal with a shaft and is telescoped relative to another part and a flexible packing is located between the telescoping parts to permit sliding movement therebetween to accommodate axial shifting of the parts.

More particularly, the invention relates to a seal for a rotating member such as a shaft which passes from a first to a second zone. The zones must be isolated from each other to prevent the passage of a fluid or a gas between the zones and a pressure differential may exist. In a structure that may embody the invention a shaft carries an annular rotating axially facing axially fixed smooth sealing surface against which is sealingly pressed a nonrotating axially facing axially movable smooth sealing surface. The non-rotating smooth sealing surface is carried on a first sealing part which is axially movable and which has a portion in telescoping relationship to a portion of a fixed second part so as to be carried thereon. Spring biasing means extend between the parts to force the first part toward the sealing surface of the shaft. A constructional arrangement permits the location of a flexible sealing packing between the telescoping portions of the two parts whereby sliding movement therebetween can be accommodated without leakage between the zones.

The present invention pertains to an improved construction of the parts and packing which permits relative movement between the parts at all times and prevents sticking or binding between the telescoping portions due to friction between the packing and parts. This primarily occurs due to swelling and expansion of the packing material in operation of the seal.

Accordingly, the present invention contemplates the provision of an improved shaft seal of the type described having a pressure sealing packing which will not bind or stick due to expansion of the material.

Another object of the invention is to provide an improved fluid seal for a rotating shaft which is self-adjusting for wear and relative axial wear of the parts without the leakage of fluid and wherein the parts will automatically adjust without lag or resistance to adjustment, compensating immediately for wear or variations in fluid pressure.

Another object of the invention is to provide a rotating shaft seal utilizing relatively telescoping parts having a sealing packing ring therebetween which will not bind or cause sticking of the telescoping parts due to expansion of the parts or of the packing ring, or due to misalignment or variations in spacing between the telescoping parts.

A further object of the invention is to provide a rotary seal utilizing telescoping parts for a self-adjusting seal surface to accommodate for wear and axial movement of the parts wherein failure of operation of the self-adjusting feature with consequent leakage of fluid is obviated, and failure of movement of the parts due to expansion of the packing from heat or the fluid used is avoided.

Another object of the invention is to provide a rotary shaft seal employing telescoping parts with a pressure sealing packing therebetween wherein less accuracy is needed in tolerance of the telescoping parts accommodating the fluid packing and of the packing itself.

A still further object of the invention is to provide an improved rotary face-to-face seal wherein the sealing surfaces are maintained in engagement by spring biasing means located between telescoping parts and wherein the biasing means is utilized to compress the packing between the telescoping parts without danger of sticking or binding occurring between the parts to prevent their telescopic movement.

Other advantages, features and objects of this invention will become more apparent to those skilled in the art from the disclosure of the preferred embodiment of the invention in connection with the following specification, claims and drawings, in which:

Figure 1 is a vertical sectional view taken along a plane passing through the axis of a rotating shaft and showing the relationship of the elements of the rotary face-to-face seal; and, Figure 2 is partial view of Figure 1 illustrating the locational relationship of the parts after the sealing packing has expanded or swelled.

The seal 10, as shown in Figures 1 and 2, operates to separate or isolate fluid zones 12 and 13, with 12 being a high pressure zone and 13 being a low pressure zone, by way of example.

The shaft 14 passes from the high pressure zone and is provided with a seal 10. A shaft seal element 16 includes an annular ring 16a mounted to rotate with the shaft 14. The annular ring 16a is suitably secured to the shaft and has a groove 16b on its inner annular surface 16c carrying a sealing material 18 to prevent fluid from passing from the high pressure zone 12 to the low pressure zone 13 along the surface of the shaft.

The sealing ring 16, mounted on the shaft, cooperatively acts with a first sealing part 20 which is movable axially with respect to the shaft, and a second sealing part 22, which is axially fixed with respect to the shaft.

On the first movable sealing part is carried a sealing ring 24, which is formed of carbon or a like non-wearing material and which has a wearing face 24a, which is pressed in face-to-face sealing engagement with the smooth annular face 16d of the shaft seal ring 16. Rings 16 and 24 may be termed first and second sealing members. The carbon seal ring 24 is annular in shape and its wearing surface 24a forms a smooth annular wearing and sealing surface that presses against the smooth annular axially facing sealing surface 16d to prevent passage of fluid therebetween. As the carbon ring wears, or with small axial movement of the shaft 14, or the second part 22, axial movement of the carbon sealing ring 24 must occur to accommodate for relative shifting of the parts. This is accomplished by axial movement of the first sealing part 20 which acts as a support for the carbon sealing ring 24.

The first sealing part 20 has an annular carrier ring or sleeve 26, which is located substantially coaxial with the shaft and which is telescopically related to an annular projecting tube 28a which is a flanged portion of the casing 28.

The carrier ring 26 has a forwardly extending flange 26a forming an inner annular holding surface 26b in which is mounted the carbon sealing ring 24. The carrier ring 26 has an annular smooth inwardly facing surface 26c which slidably mounts the carrier ring on the outer surface 28b of the tube 28a. The carrier ring thus can slide axially to maintain the carbon sealing ring 24 in coacting sealing engagement with the shaft ring 16.

To prevent rotation of the sealing ring 24 and the carrier ring 26, the carrier ring has a plurality of axially extending ribs 26d which project outwardly to be held between teeth 28c in the outer tubular wall 28d of the casing 28.

The casing 28 thus supports the carrier ring 26 and is itself supported in the housing 30. The casing 28 is annular shaped as a whole, with a base 28e and the two flanges 28a and 28d turned to extend axially from the base 28e. The flange 28a is annular in shape and spaced from the shaft 14 and the outer flange 28d fits snugly within the annular inner surface 30a of the housing. The free end of the outer flange 28d of the casing is turned inwardly in a lip 28f, which abuts a stop flange 30b projecting inwardly within the inner surface of the housing. This flange 30b limits the depth of insertion of the casing into the housing. The casing is held in place within the housing by an annular clamping ring 32 which fits against the end of the housing and is held in place by bolts 34 threaded into threaded holes in the end of the housing wall.

To insure that the first sealing member 20 will continually follow the shaft with axial movements thereof or with wear of the carbon sealing ring 24, a compression spring 35 in the form of wave washer springs 36 with interposed flat washers 38 surround the tube 28a and urge the first sealing member 20 toward the shaft sealing ring 16. The spring 35 bottoms on an inner surface 28g of the casing 28 and urges the carrier ring 26 with its supported sealing ring 24 to the right, as shown in the drawings.

The spring 35 acts against a packing supporting ring 40, which is annular in shape and slidably surrounds the tube 28a. Surrounding the packing supporting ring 40, is a tubular flange 26e which projects from the carrier ring 26 to form an annular recess 42 in which is located the packing 44 and the packing supporting ring 40. The packing supporting ring 40 has an upper face 40a which pushes the carrier to the right and presses the packing 44 between the carrier and the ring 40.

The packing 44 is made of a flexible material such as rubber, leather, composition or the like and is annular in shape. The inner surface 44a is slidable being pressed against the outer surface 28b of the tube 28a to prevent the leakage of fluid. The outer surface 44b of the packing ring is pressed against the inner surface of the flange 26e of the carrier ring 26. The forward radial face of the packing ring has a rounded annular ridge 44c which projects into a recess 26f in the carrier ring to aid in forming a sealing arrangement. The packing ring 44 is substantially rectangular in shape with the ridge 44c on one face. With the compression of the ring between the tube 28a and the flange 26e a convolution 44d or annular groove is formed in the face of the ring opposite the ridge 44c. Thus, the face of the packing ring 44, opposite the ridge 44c has an axially facing gap or recess 44d to form a convolution in the axial surface of the packing ring. In some instances, this gap 44d may be deliberately formed by removal of the material. The gap 44d permits the material of the packing ring 44 to expand in thickness during operation without the packing ring forcibly binding or sticking against the outer surface 28b of the tube 28a. If such sticking were permitted to occur, it would prevent axial movement of the carrier ring 26 and would prevent the carbon sealing ring 24 from remaining in sealing engagement with the shaft ring 16 and leakage might occur.

Expansion of the material of the ring may occur for numerous reasons. Heat generated by friction will cause expansion. Use of hot fluids will also heat the parts. With a porous packing, fluid and lubricants will cause expansion. The present arrangement and packing structure will accommodate intermittent swelling and contraction, such as caused by alternate heating and cooling without breaking the packing seal.

The axially facing gap or recess 44d also permits compression of the packing ring between the two annular surfaces 44a and 44b so that minor inaccuracies in manufacturing, variations due to manufacturing, and the like will be accommodated without causing leakage. Further, vibrations and shocks will be more readily accommodated by the packing ring and the ring construction, insuring a continued seal between the telescoping parts and insuring that axial movement of the first sealing member will not be impeded due to increased friction and binding or sticking of the parts.

Thus. it will be seen that I have provided an improved rotary seal of the axially adjusting face-to-face type which meets the objects and advantages hereinbefore set forth. The arrangement is uncomplicated in construction and permits long wear with an effective operating life, without necessitating adjustment and attention and will insure a secure seal under conditions which cause ordinary seals to bind and stick and become inoperative.

I have, in the drawings and specification, presented a detailed disclosure of the preferred embodiments of my invention, but it is to be understood that I do not intend to limit the invention to the specific form disclosed, but intend to cover all modifications, changes and alternative constructions and methods falling within the scope of the principles taught by my invention.

I claim as my invention:

1. A seal of the axially shiftable relatively rotating face-to-face type comprising a first sealing member having an annular sealing surface, a second sealing member having a coacting annular sealing surface in relatively rotating sealing engagement with the surface of said first member, support means for said second sealing member including a first part having a radially inwardly facing cylindrical surface and a second part telescoped within said first part and having a radially outwardly facing cylindrical surface facing said cylindrical surface of the first part and forming an annular space therebetween, said second sealing member being connected to one of said parts, a spring means in said space with one end bottomed on said second part for acting in opposition to the first part to urge said second sealing member to sealing engagement with said first sealing member, a first annular face on said first part facing said spring, a member on the other end of the spring having an annular second face facing said first face, one of said faces having a smooth planar radial surface, and an annular sealing ring formed of a resilient material located in the space between said faces and confined between said cylindrical surfaces and having an axially facing groove located on the side of the ring facing said radial face with a portion of the ring outside of said groove and a portion of the ring inside said groove riding on said radial surface to slide thereon with expansion and contraction of the sealing ring in a radial direction.

2. A seal of the axially shiftable relatively rotating face-to-face type comprising in combination a first sealing member having an annular sealing surface, a second sealing member having a coacting annular sealing surface in relatively rotating sealing engagement with the surface of said first member, support means for said second sealing member including a first part having a radially inwardly facing cylindrical surface and a second part telescoped within said first part and having a radially outwardly facing cylindrical surface facing said cylindrical surface of said first part and forming an annular space therebetween, said second sealing member being connected to one of said parts, a spring means in said space with one end bottomed on said second part for urging the first part away from the second part to urge said second sealing member into sealing engagement with said first sealing member, a first flat radial face on said first part facing said spring, a member on the other end of the spring having an annular flat radial second face facing said first face, an annular sealing ring formed of a resilient material located in the space between said faces and confined between said cylindrical surfaces and having an axially facing groove located on one radial side of the ring facing one of said radial faces with the portion of the ring inside and outside of said groove riding on said one flat radial face to slide thereon with expansion and contraction of the sealing ring, a locating ridge on the opposite radial surface of said sealing ring, and a locating groove formed in the face adjacent said locating ridge substantially in the center thereof and locatingly receiving said ridge for positioning said sealing ring and the groove in the sealing ring.

3. A seal of the axially shiftable relatively rotating face-to-face type comprising in combination a first sealing member having an annular sealing surface, a second sealing member having a coacting annular sealing surface for rotating relatively to the first sealing member and in sealing engagement with the surface of said first member, support means for said second sealing member including a first part having a radially inwardly facing cylindrical surface and a second part telescoped within said first part and having a radially outwardly facing cylindrical surface facing said cylindrical surface of said first part and forming an annular space therebetween, said second sealing member being connected to said first part and being supported thereon, a coil compression spring surrounding said second part and bottomed thereon for urging the first part and second sealing member to sealing engagement with said first sealing member, a first radial face on said first part extending between said cylindrical surfaces and facing said spring, an annular ring surrounding the cylindrical surface of said second part and in engagement with the spring, said ring having an annular flat radial second face facing said first face, an annular packing and sealing ring formed of a resilient material located between said faces and confined in said space between said cylindrical surfaces, means defining an axially facing groove in said sealing ring facing said second face with an annular ridge on each side of the groove in sliding engagement with said second face, a locating groove formed in said first face and extending annularly around said first face in substantially the center thereof and having substantially the radius of said groove in said sealing ring, and a locating ridge on the surface of said sealing ring extending axially and locatingly received in said locating groove in said first face.

4. A seal of the relatively rotating seal ring type including first and second seal rings in face-to-face sealing relation, a casing for said seal including an outer peripheral wall, a back wall and an inner tubular wall, a carrier for the second seal ring in said casing freely surrounding said tubular wall, said carrier having a recessed end facing the back wall, a packing supporting ring slidably mounted on the tubular wall and extending into said recessed end of the carrier, the bottom of the recessed end of the carrier and the packing supporting ring providing opposed radially extending surfaces at least one of which is planar, a resilient packing ring between said surfaces having an annular groove in the face thereof opposite the planar surface, and a spring between the back wall of the casing and the packing supporting ring for pressing the packing ring into sealed relation with both the carrier and the tubular wall and said groove opposite the planar surface accommodating expansion of the packing ring therein to prevent binding of the packing ring on the tubular wall and thereby maintain the carrier in axially shiftable relation relative to the casing under the load of said spring.

References Cited in the file of this patent
UNITED STATES PATENTS

| | | |
|---|---|---|
| 2,436,866 | Lancaster | Mar. 2, 1948 |
| 2,628,852 | Voytech | Feb. 17, 1953 |
| 2,653,837 | Voytech | Sept. 29, 1953 |
| 2,761,711 | Ecker | Sept. 4, 1956 |
| 2,824,759 | Tracy | Feb. 25, 1958 |
| 2,872,220 | Payne | Feb. 3, 1959 |